March 29, 1960

H. S. GREEN 2,930,145

PARACHUTE LANDING FALL TRAINER

Filed Dec. 16, 1955

INVENTOR.
HOWARD S. GREEN
BY
Louis B. Applebaum
ATTORNEYS

March 29, 1960 H. S. GREEN 2,930,145
PARACHUTE LANDING FALL TRAINER
Filed Dec. 16, 1955 8 Sheets-Sheet 3

Fig. 3

INVENTOR.
HOWARD S. GREEN
BY
Louis B. Applebaum
ATTORNEYS

Fig. 6

INVENTOR.
HOWARD S. GREEN
BY
Louis B. Applebaum
ATTORNEYS

Fig. 8

INVENTOR.
HOWARD S. GREEN

Fig. 10

United States Patent Office 2,930,145
Patented Mar. 29, 1960

2,930,145

PARACHUTE LANDING FALL TRAINER

Howard S. Green, Fairfax, Wilmington, Del., assignor, by mesne assignments, to the United States of America as represented by the Secretary of the Navy Application December 16, 1955, Serial No. 553,671

9 Claims. (Cl. 35—29)

This invention relates to improvements in training devices, and more particularly pertains to devices simulating realistically the characteristics of a parachute from the initial free fall to the removal of the parachute harness after contacting the ground. The invention is intended particularly to provide means to train military and civilian personnel in the physical characteristics encountered in a parachute jump, with emphasis on realism and safety of operation.

Training devices heretofore employed were not capable of simulating the exact fall and landing conditions encountered in a parachute jump. Existing trainers merely allow the student to jump and, by means of suitable harness, sense the shock provided by an opening parachute, as well as the vertical descent with the open parachute. None, however, duplicate the oscillation of the body during descent, with a slight rotation about its own axis. In addition, there is no provision of a simulation for execution of a proper parachute landing fall upon hitting the ground. However, the complete and realistic simulation of the entire jump and landing procedure is contained in the device of this invention.

The primary object of the invention is to simulate realistically the characteristics of a parachute jump from the initial free fall to the proper landing fall on hitting the ground.

Another object is to simulate the oscillation of the body in a vertical plane that occurs during the descent of an opened parachute.

Yet another object is to provide means to permit the body to rotate slightly about its own axis.

A further object is to provide means to enable the student to execute a proper parachute landing fall as he hits the ground, the risers continuing to descend until ground clearance is reached, for providing realistic simulation.

Still another object is to control the descent of the trainee at a desired rate of speed.

Yet another object is to provide means furnishing a reacting torque as a drum rotates on payout to obtain the driving force to rewind the cable on the drum after the weight of the trainee is removed.

Another object is to automatically control payout and rewind of a trolley drum by means of ratchets that will operate in both directions.

Yet another object is to provide an automatically operating bumper locking mechanism adapted to be released by the instructor.

And yet another object is to avoid the requirement for any electrical power, with complete reliance on a mechanical system to operate the training device.

Other objects and many of the attendant advantages of this invention will be readily appreciated as the same becomes better understood by reference to the following detailed description when considered in connection with the accompanying drawings wherein.

Similar numerals refer to similar parts throughout the several views.

The landing fall trainer is capable of being used whenever a realistic parachute jump is to be provided. In use of the device, the trainee will stand on an elevated jump tower (not shown) and fasten his parachute harness to support ring 20 by means of four risers 22 secured to the support ring at 24. D-ring 26, welded to support ring 20, secures support cables 28 thereon. Cables 28 are joined to O-ring 30 which passes through the bottom eye of swivel 32. Swivel 32 is attached directly to hoist cable 34 by clamp thimble 36. Swivel 32 allows a slight rotation of the trainee about his vertical axis to provide a continuously changing direction.

Upon signal from the instructor, the student exits from the tower door and falls approximately ten feet. He receives a shock simulating the sudden opening of the canopy of his parachute and is suspended below trolley 38 as it rides down a sloping cable 39. At the proper point along the cable, the trolley engages stationary bumper housing 40 and the student is caused to oscillate about the suspended point of his risers.

Trolley 38 is provided with two steel side frames 42 which supply the support for all the trolley component parts. Sheaves 44 support trolley 38 from suspended cable 39 and allow trolley 38 to roll freely on the slope of the cable.

Figure 2:
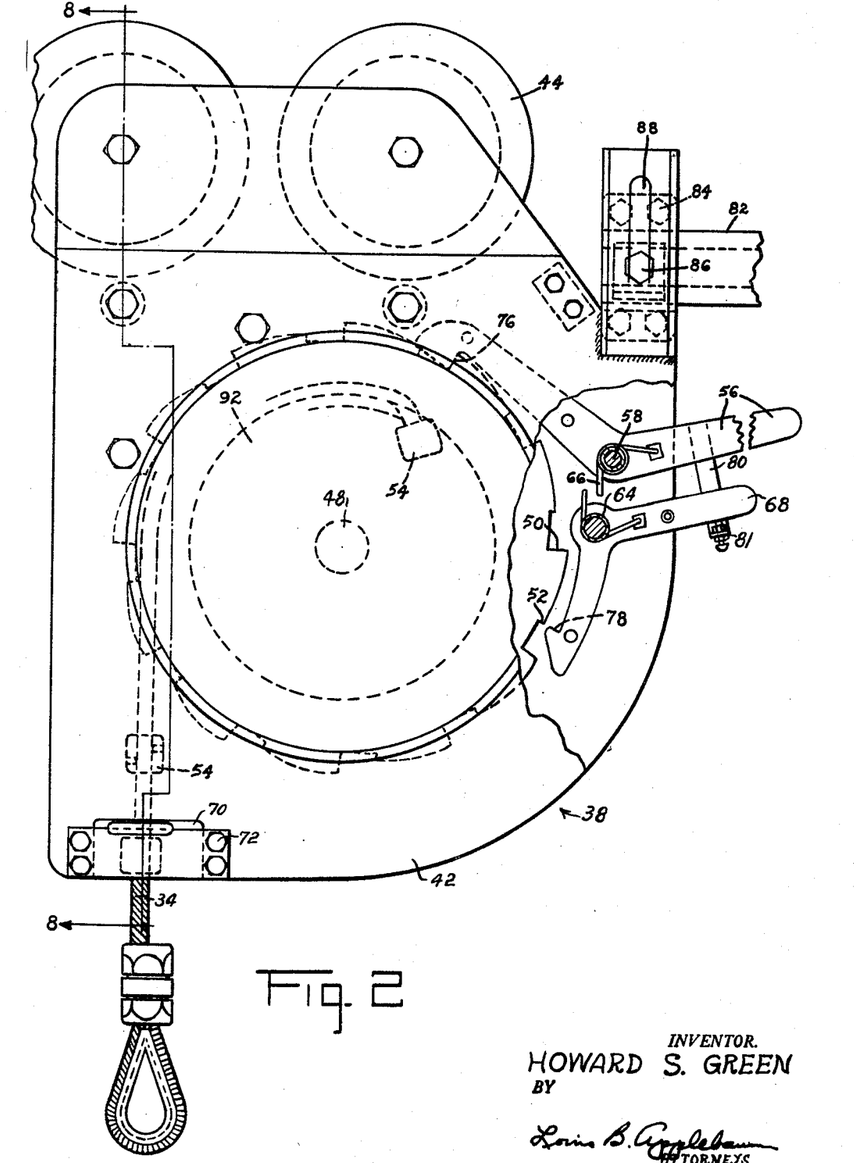
Fig. 2 is a side elevation of the trolley assembly, with parts broken away.
Figure 8:
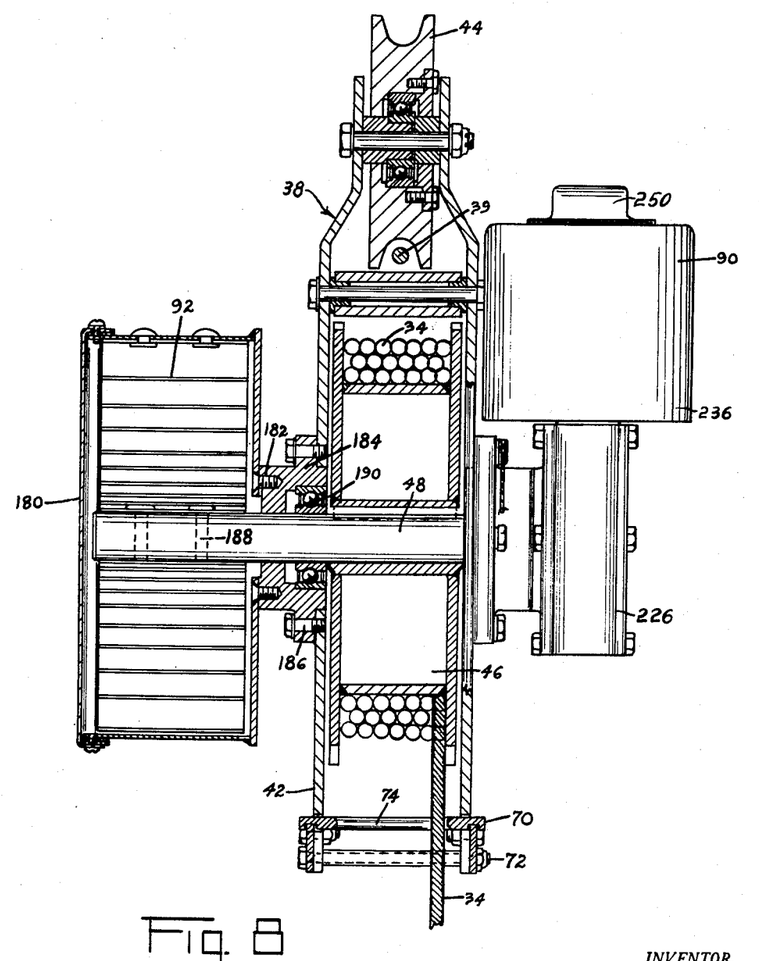
Fig. 8 is a transverse section taken on the line 8—8 of Fig. 1, illustrating the cable and rewind spring motor assembly.

Hoisting drum 46, illustrated in detail in Fig. 8, rotates on main shaft 48 to pay out and rewind the hoist cable 34. The flanges on the drum are machined with radial flat teeth areas, as is shown at 50 and 52 in Fig. 2, facing in alternative directions to engage either drum release pawl 56 or rewind pawl 68 to provide a means for restraining motion in either direction. As is apparent from the figures, cable 34 is wound on the drum and suspends riser ring 20, to which the trainee is attached, below the trolley. Cable stop 54 is provided on cable 34 to adjust the payout length of usable cable.

Drum release pawl 56 is a double pawl and is pivotally secured to frame 42 by means of a shaft 58 extending between frame plates 42 and held in position by nuts 60. Torsion spring 62 is urged against pawl 56 by virtue of spacer sleeve 64, the free ends thereof being bent over as shown at 66. Spring 62 assists in preventing the hoisting drum from paying out. Pawl 56 cannot be released until trolley 38 engages bumper housing 40 and the instructor's controls become effective as will presently appear clear.

Hoisting drum rewind pawl 68 is also a double pawl and is spring-loaded in a manner identical with drum release pawl 56, to engage the drum flange teeth 52 when the drum release pawl 56 is disengaged from the drum. Pawl 68 prevents the drum from rewinding after a trainee has been lowered to the ground and the risers unsnapped from his harness, until disengaged by the re-engagement motion of the drum release pawl 56 when the instructor's control trolley release control 178 in bumper housing 40 is pulled.

Slotted cable guide 70, bolted at 72 to side plates 42, contains aperture 74 through which cable 34 extends. Guide 70 replaces a level wind and retains cable 34 in an approximate center position with respect to the drum. During rewind the cable attempts to pile up in the middle, but the wraps shift to one side or the other and results in an essentially level wind. The usable length of the cable is such that the riser ring 20 is not pulled below a minimum height of seven feet above the ground at any time during descent operation. The usable cable length is adjusted by means of payout stop 54. The time to ascertain the proper length is when the trolley engages the bumper 40 at the descent position.

Drum release pawl 56 and the drum rewind pawl 68 must be adjusted laterally on their pivot axes to mate flush with the drum flange teeth 50 and 52. The pivot bolt nuts 60 should be only finger tight to allow free rotation of the pawls by torsion springs 62. Drum release pawl torsion spring 62 keeps drum pawl teeth 76 engaged with drum flange teeth 50 until such time as drum release arm 128 engages the drum release pawl 56 and causes the drum release pawl to rotate in a counter clockwise direction. Rotation of the drum release arm 128 until the drum release pawl contacts a stop (not shown) disengages drum pawl teeth 76 from the drum flange teeth 50. Link 80 positions drum release pawl 56 relative to drum rewind pawl 68 to prevent the drum rewind pawl teeth 78 from engaging drum flange teeth 52 when drum release pawl teeth 76 are engaged with drum flange teeth 50 and engaging drum rewind pawl teeth 78 with drum flange teeth 52 when drum release pawl teeth are not engaged with drum flange teeth 50. Link adjusting means 81 adjusts the position of drum rewind pawl 68 relative to drum release pawl 56 so that when drum release pawl contacts a stop (not shown), drum rewind pawl teeth 78 will properly contact drum flange teeth 52.

Figure 1:
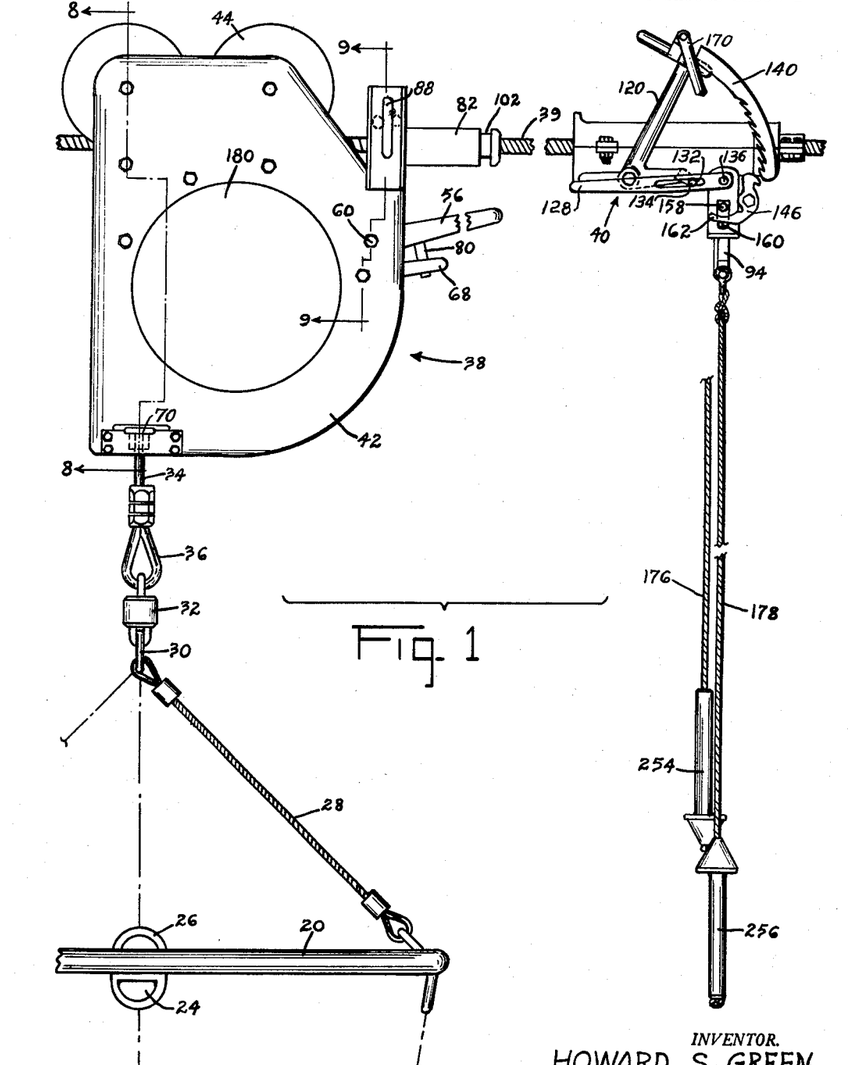
Fig. 1 is an elevation of a landing fall trainer, showing a preferred embodiment of the invention.
Figures 7, 9:
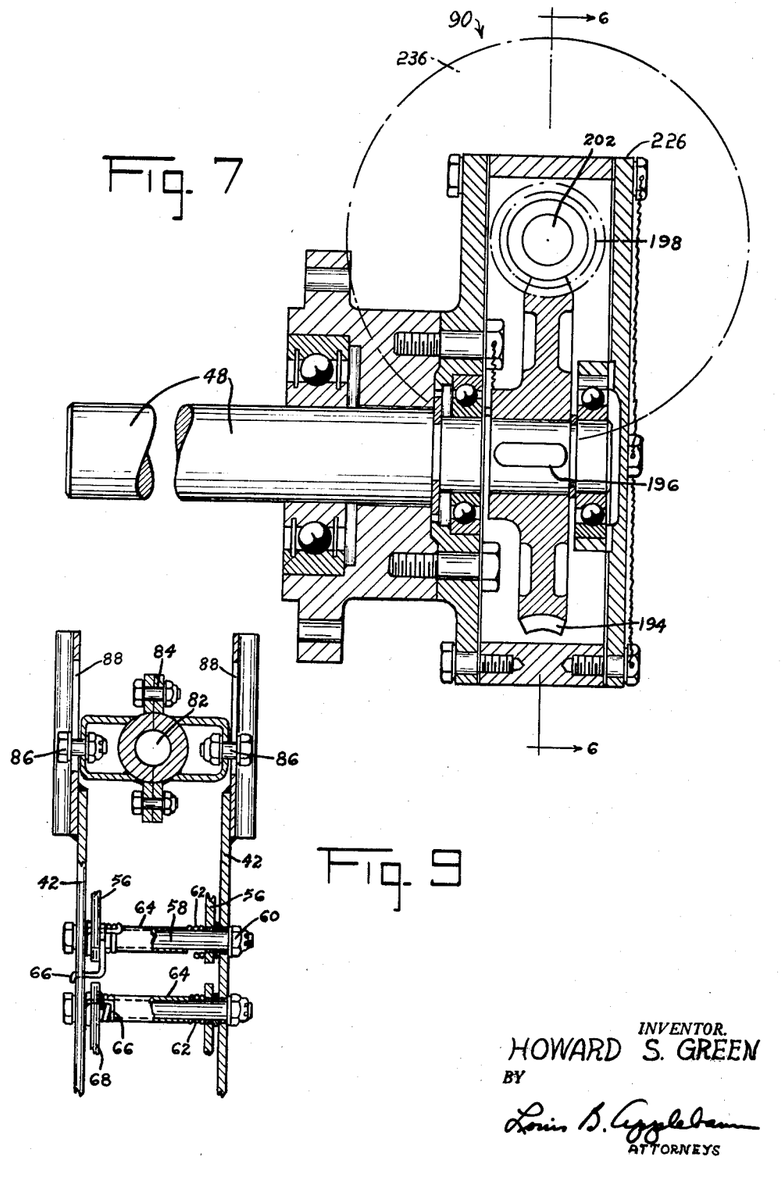
Fig. 7 is a plan view taken on the line 7—7 of Fig. 6.
Fig. 9 is a section taken on the line 9—9 of Fig. 1, illustrating the panel structures.

Bumper lead 82 is illustrated in detail in Figs. 1 and 9 and is attached between side frames 42. It extends forwardly of trolley 38 and is positioned in the vertical plane center of trolley 38 by attaching bolts 84 to prevent cable friction on the sides. Nuts 86 are installed finger tight to allow bumper lead 82 to pivot and travel up and down freely as catenary demands. Nuts 86 can be loosened in slot 88 for desired positioning with respect to bumper 40.

Governor 90 and rewind spring 92 are mounted on trolley 38 and will presently be described in greater detail.

Figure 3:
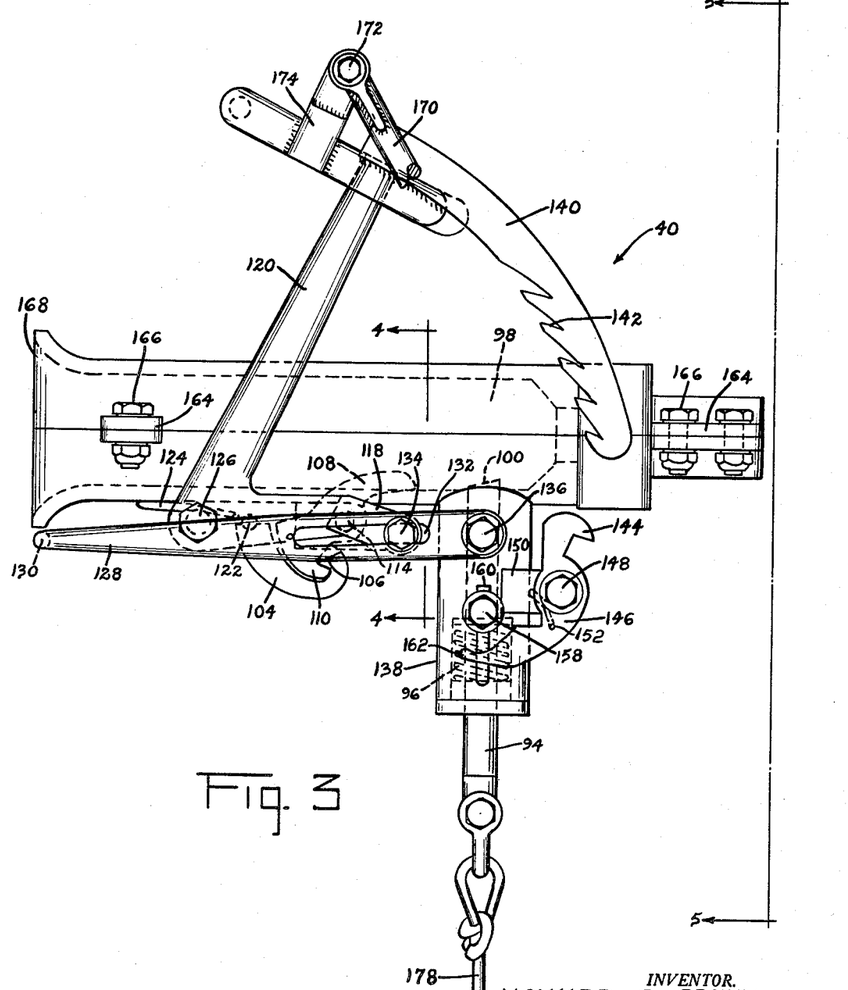
Fig. 3 is an enlarged view of the bumper assembly shown in Fig. 1, illustrating the component parts in greater detail.
Figures 4, 5:
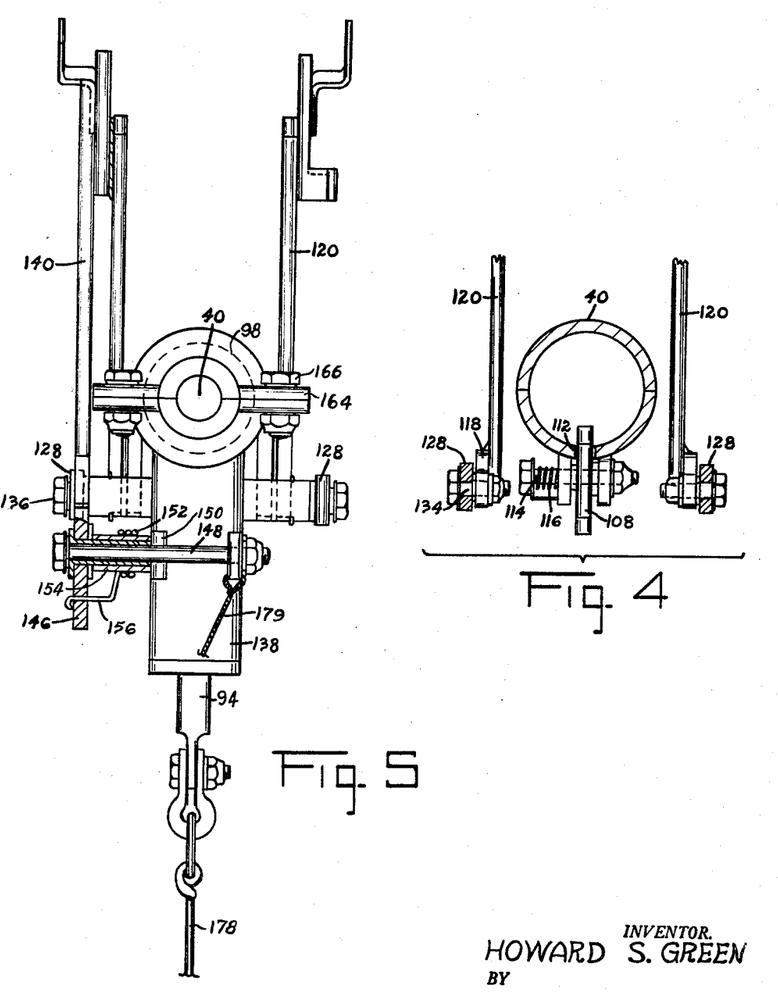
Fig. 4 is a section taken on the line 4—4 of Fig. 3.
Fig. 5 is an end view of the bumper assembly of Fig. 3, with the cable and yoke assembly omitted for clarity.

The instructor's controls and the components for engaging the trolley upon contact are contained in bumper housing assembly 40 (see Figs. 3 to 5). Bumper assembly 40 is positioned on the up-slope of cable 39 and its exact position controls the desired amplitude of oscillation of the trainee as the momentum of trolley 38 at the time of engagement creates the oscillation.

Bumper assembly 40 is provided with trolley engaging sear 94, springloaded at 96 to extend into bumper housing chamber 98. Sear 94 is rod-like in construction and has an inclined edge 100 in order to readily enable the free edge of bumper lead 82 to ride thereover, depressing sear 94 against the force of spring 96. When groove 102 in bumper lead 82 travels over sear 94, spring 96 urges edge 100 into the groove to lock the bumper lead 82 and hence trolley 38 into position with respect to bumper 40 until released by the instructor.

Up-latch 104 prevents the release latch 108 from being inadvertently actuated until rotated by bumper lead 82 mating in housing chamber 98. Uplatch 104 is secured to a bell-crank lever drum release 120 at one end and contains hook end 106 at the free extremity. Release latch 108 is pivotally secured at 114 on the under surface of bumper 40 and contains lip member 110 adapted to receive and hold hook end 106 of uplatch 104 in locked position. The free end of release latch 108 is arcuate and extends through slot 112 in bumper housing 40. Release latch 108 is pivoted on bolt 114 and is maintained under tension by means of spring 116. Tab 118, welded to bell-crank lever 120, is apertured to receive therethrough bolts 134.

Uplatch 104 is fixedly secured on transverse rod 122. The transverse rod 122 is fixedly secured to the bell crank lever release 120. A U-shaped spring 124 wound around pivot rod 126 seats under the bumper housing normally bears uplatch 104 against release latch 108 in a locked position. Transverse rod 126 is supported below housing 40 by means of downwardly extending means not shown and in turn retains bell crank lever 120 thereon for pivoted movement.

The means to release drum release pawl 56 when bumper lead 82 seats in housing 40 is provided by a pair of drum release arms 128 joined at the free ends by crossbar 130. Drum release arms 128 are provided with motion slots 132 through which extend mounting bolts 134. Lever arms 128 are pivoted on rods 136 which are anchored on spring housing 138.

A drum release ratchet lever 140 depends downwardly from the upper extremity of the bell-crank 120 and is provided with ratchet teeth 142 adapted to engage lip 144 of down latch 146 and prevent the drum release pawl 56 from accidental release. This also relieves the instructor of the task of maintaining force to keep the drum release pawl 56 disengaged. Latch 146 is pivotally mounted on a bolt 148 secured between brackets 150 on cylinder housing 138 and is maintained under tension by means of spring 152 held on spacer 154. The spring 152 terminates in a hooked end 156 which is in engagement with down latch 146. Latch 146 is normally in the position illustrated in Fig. 3. When engagement with lever 140 is to be released, the instructor retracts sear 94 downwardly against the force of spring 96. This causes pin 158, extending transversely from sear 94 through a slot 160 in cylinder 138 to move downwardly until seated on extension 162 of down latch 146. Continued downward movement of pin 158 forces latch 146 in a counter-clockwise rotation until pin 158 is freed from seat 162. At the same time, lever 140 becomes free of engagement with lip 144.

The preferred embodiment of the invention illustrates bumper housing assembly 40 as being of two half sections, with mating flanges 164 held together by transverse bolts 166. The open end of the housing is flared at 168 so that bumper lead 82 is assured of ready entrance.

Drum release yoke 170 is pivotally mounted at 172 on extension 174, welded on lever 120. When yoke 170 (shown fragmentarily only in Fig. 3) is actuated by exerting a strong steady pull on rope 176, the drum releasing pawl 56 is rotated in a clockwise direction as viewed in Fig. 2, allowing drum 46 to pay out.

The instructor's trolley release control rope 178 is attached to sear 94 and is pulled downwardly, enabling sear 94 to be retracted, thereby allowing trolley 38 to roll away from the housing. Safety wire 179 is attached to bolt 148 and is secured to the bottom of cylinder 138 to prevent movement of the bolt 148 relative to the cylinder 138, thus preventing accidental opening of the bolt and assuring proper operation of the equipment at all times.

Spiral motor spring 92 is mounted on extended end of main shaft 48 and is utilized as a source of energy to rotate drum 46 for rewind of cable 34 after the trainee has unsnapped his harness from the risers and the rewind pawl 68 has become engaged. The initial torque of rewind spring 92 can be adjusted for variation in spring performance. By increasing or decreasing the number of turns, the torque is varied at both the cable in or cable out position.

Spring housing 180 is attached at 182 to spring housing adapter 184. Adapter 184 is secured by four bolts 186 to the trolley housing. Spring locating rivets 188 are provided on shaft 48. Roller bearings 190 insure free rotation of drum 46.

Figure 6:
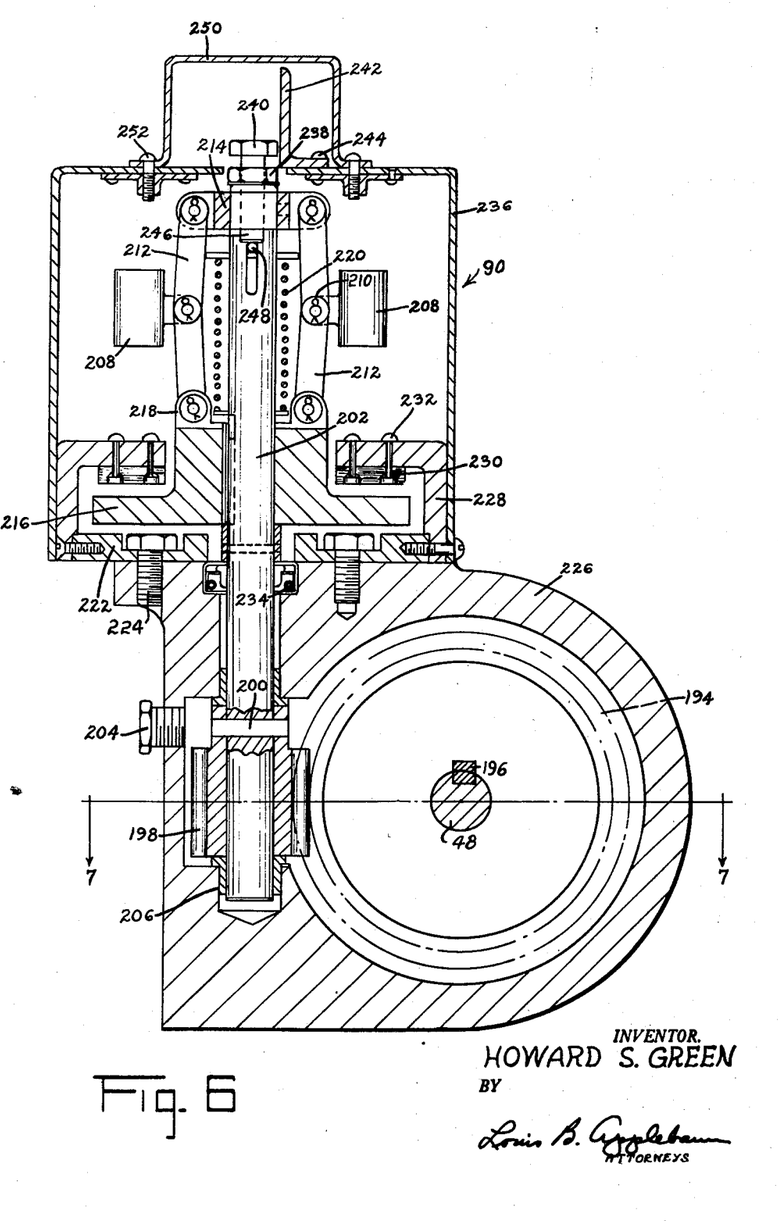
Fig. 6 is a vertical section taken on the line 6—6 of Fig. 7, illustrating the governor construction.

Rate of descent of parachute cable 34 is controlled by governor 90. The construction of the governor is of the small flywheel type and is shown in detail on Figs. 6 to 8. It is geared to the main shaft 48 and is adjusted to obtain a selected rate of descent, as is desired.

Worm gear 194 is keyed at 196 to main shaft 48 and operates worm 198, retained by means of pin 200 on governor shaft 202. Plug 204 is provided, as well as "oilite" bearing 206. Rotation of the main shaft, as the drum cable pays out during the descent of the trainee, causes worm gear 194 to rotate simultaneously, thereby actuating governor 90 through worm 198.

Weights 208 are mounted pivotally at 210 on flywheel links 212. Collar 214 retains one set of links on shaft 202, while the other set of links 212 are secured pivotally to governor brake plate 216 by means of vertical ears 218. Compression spring 220, mounted on shaft 202, urges links 212 vertically. A second, or lower plate 222 is bolted at 224 to worm gear housing 226 and includes an L-shaped brake support member 228 overlying plate 216 in spaced apart relation therewith. Brake 230 is fastened by means of rivets 232 to the underside of the overlying leg portion of brake support member 228. Oil seal means 234 are provided around governor shaft 202.

The governor assembly is enclosed in a casing 236 which is slotted to enable threaded adjusting nut 238 to be retained on adjusting screw 240 to thereby provide a positive positioning of the adjusting screw when the rate of descent has been selected by lining up the top of screw 240 with the properly calibrated line (not shown) on indicator 242. Indicators 242 is fastened at 244 to the governor casing and is in close proximity to the extended portion of screw 240. Screw 240 is adjustably held in bore 246 in governor shaft 202 and is engaged by pressure pin 248. Cover 250 is bolted at 252 to casing 236 to protect the exposed parts of the adjusting means. Thus, by pre-selected governor settings on 242, the rate of descent for a given weight of the trainee can be readily determined.

Figure 10:
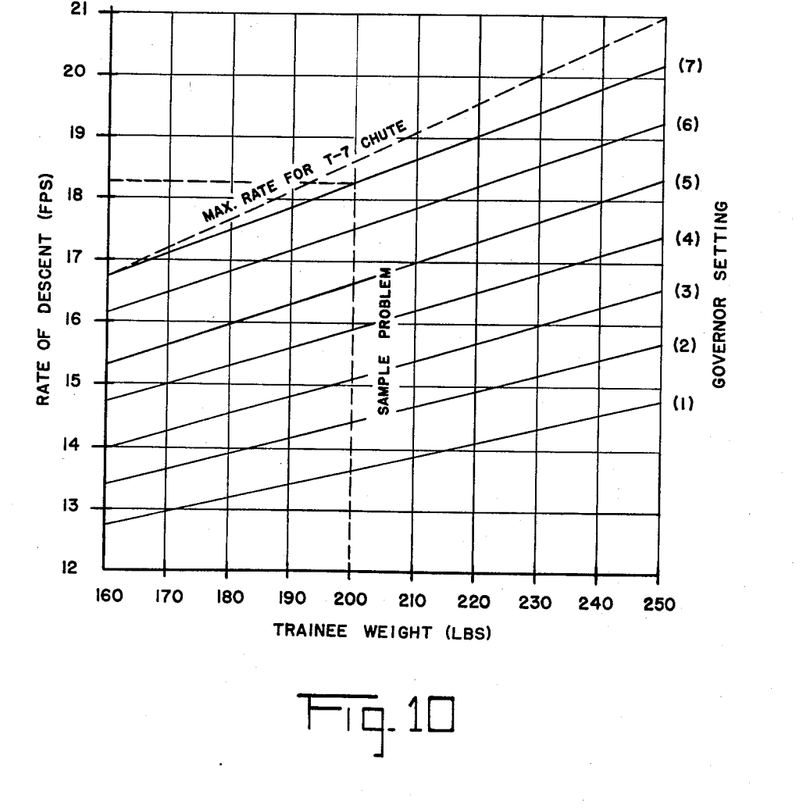
Fig. 10 is a graph illustrating the relationships involved in the selection of the rate of descent.

A sample problem for a "T-7" parachute is illustrated in Fig. 10 wherein the weight of the trainee (lbs.) is plotted against the rate of descent (f.p.s.). The rate of descent is uniform and the maximum rate of descent for each load varies with the load on risers 22 and is determined as follows:

$$\text{Maximum rate of descent (f.p.s.)} = 19.85\sqrt{\frac{W}{225}}$$

where $W$ = loads in pounds.

Thus, for a trainee weighing 200 lbs, a governor setting of No. 1 would give a steady rate of descent of 13.6 f.p.s. (within ±1 f.p.s. tolerance). The same trainee, with a governor setting of No. 7, would have a rate of descent of 18.3 f.p.s.

In operation of the training device, the student fastens risers 22 around him in a manner similar to that in an operational parachute jump. A slack of about ten feet is provided for the initial free fall. The trainee exits from the platform door on command and receives a shock at the end of the free fall simulating the sudden opening of the parachute canopy as drum 46 is restrained from rotating. Risers 22 slip from the restraining clip or the instructor's hand during the free fall. Trolley 38, with the trainee suspended below, travels down sloping cable 39 and mates with bumper housing 40.

Bumper lead 82 enters bumper housing chamber 98 and thereby pivots release latch 108, finally coming to rest against the inner end of bumper assembly 40. Sear 94 is depressed against spring 96 and then enters bumper lead groove 102 to hold trolley 38 in securely locked position. Now up-latch 104 is freed from engagement by latch release 108. Simultaneously with the movement of latch 108, double hoisting pawl 56 slides under drum release arms 128.

The trainee is now oscillating slightly in a manner similar to such motion obtained when actually suspended from a parachute. The instructor now exerts a strong steady pull on cable 176, thereby drawing handle 170 downwards. Bell-crank lever 120, secured by handle 170, pivots at 126 until ratchet arm 140 pivots around into engagement with locking lip 144 of down latch 146. This frees the instructor of the necessity for holding cable 176. Downward motion of bell-crank lever 120 is transmitted to bolt 134 by tab 118, motion of bolt 134 in slot 132 causes handle 128 to move downwardly in counter-clockwise direction. Movement of handle 128 turns drum release pawl 56 in a clockwise direction, disengaging drum teeth 50 and allowing drum 46 to rotate and pay out cable 34.

Flywheel governor 90 has been adjusted for the desired rate of descent and this pre-selected rate is maintained as the drum cable lowers. The potential energy (weight of the trainee suspended from the drum) is transformed into kinetic energy when drum 46 is released. Shaft 48 is keyed to spring 92, with governor 90 driven by worm 198. Weights 208 move outwardly thereby raising brake shoe 216 in contact with friction brake 230 and compression spring 220 is adjusted to select the desired rate of descent as shown in Fig. 10.

Rotation of drum 46 energizes motor rewind spring 92. When the drum release pawl 56 contacts the stop (not shown) located inside side frame 42, rewind pawl 68 ratchets as the student descends and engages to prevent rewind.

The student executes a proper landing fall upon ground contact. The risers are then detached from the parachute harness and a trolley return rope (not shown) is snapped to risers 22. To complete the operation, the instructor pulls down on rope 178. This disengages sear 94 from bumper lead groove 102, allowing trolley 38 to slide free of housing 40 by gravity. At the same time, downward movement of sear 94 causes pin 158 to pivot down-latch 146 counter-clockwise as viewed in Figure 3 until ratchet teeth 142 on arm 140 are disengaged from lip 144. Drum release pawl 56 disengages rewind pawl 68 and ratchets as the energized motor spring 92 rewinds the drum. A specified number of pre-turns of spring 92 furnishes a reacting torque to return riser ring 20 to full up position. Spring 124 returns lever 120 to the vertical position, which is then restrained by the up-latch. Trolley 38, in this form of the invention, is manually returned to the jumping platform and all controls are automatically in position for the next cycle of operation. "Down" arrow 254 on rope 176 and "Up" arrow 256 on rope 178 aids in avoiding confusion as to the correct rope to pull.

Obviously many modifications and variations of the present invention are possible in the light of the above teachings. It is therefore to be understood that within the scope of the appended claims the invention may be practiced otherwise than as specifically described.

What I claim is:

1. A parachute jump training device comprising support means for said device, a trolley assembly movably mounted on said support means, a hoisting drum carrying payout cable rotatably secured in said trolley assembly, flanges on said drum, said flanges including teeth in both directions, double pawl means mounted on said trolley assembly and engaging said flange teeth, restraining means on said support means adapted to receive and hold said trolley assembly and means on said restraining means releasing said hoisting drum cable, said double pawl means comprising pivotal mounting means on said assembly, pawl teeth at one end thereof engaging said flange teeth and means at the other end thereof engaging said restraining means for actuation of said restraining cable.

2. The combination of claim 1, wherein said trolley assembly includes an automatic rewind spring operatively connected with said drum.

3. The combination of claim 1, wherein said trolley assembly includes a governor operatively connected with said drum and controlling the rate of payout of said cable.

4. A parachute jump training device slidably retained on a support means, comprising a trolley assembly, including means for paying out a cable, movably mounted on said support means, bumper lead means on said trolley assembly, a bumper housing secured on said support means, latch means on said bumper housing receiving said bumper lead means and keeping same in locked position, and means on said bumper housing automatically actuating said means for paying out a cable.

5. A parachute jump training device slidably retained on a support means, comprising a trolley assembly, including means for paying out a cable, movably mounted on said support means, bumper lead means on said trolley assembly, a bumper housing secured on said support means, latch means on said bumper housing receiving said bumper lead means and keeping same in locked position, said latch means comprising an elongated sear extending into said bumper housing, and means engaged by said sear whereby said trolley is released as said sear is withdrawn from said housing.

6. A parachute jump training device comprising a support means, a trolley assembly movably retained on said support, a bumper housing fixed on said support means and adapted to receive said trolley assembly, a drum for paying out cable in said trolley assembly, a shaft mounting said drum and extending through said trolley, a governor mounted on said shaft and means in said governor controlling the rate of descent of the cable.

7. The combination of claim 6 wherein a rewind spring is mounted on said extending shaft, said rewind spring having a selected number of pre-turns to vary the torque, and means to adjust said torque.

8. A parachute jump training device comprising a support means, a trolley assembly movably mounted on said support means, a shaft extending through said trolley assembly, a cable drum mounted rotatably on said shaft, a rewind spring mounted on said shaft to automatically rewind said cable drum, pawl means on said trolley assembly, a bumper lead extending from said trolley assembly, a bumper lead housing having a chamber fixed on said support means, with an opening in said chamber, sear means extending through said opening into said chamber, whereby said bumper lead engages said sear means and is retained in a locked position, a bell-crank lever pivotally mounted on said bumper lead housing, said lever including a pawl engaging arm, latch means on said housing for holding said lever in locked position, means on said lever pivoting the lever and thereby releasing the pawl means to payout the cable drum and means to control the rotation rate of the drum.

9. A parachute jump training device comprising travel support means, travel means slidably suspended on said support and carrying cable hoist means, cable release means mounted on said travel support means and engaging said travel means for payout of said cable hoist means, means supporting a trainee, swivel means connected to said cable hoist means, a ring member connecting said trainee support means and said swivel means, and release means on said cable release means actuated by an instructor to release the cable release means.

References Cited in the file of this patent

UNITED STATES PATENTS

| | | |
|---|---|---|
| 993,409 | Roderick | May 30, 1911 |
| 1,017,010 | McNair et al. | Feb. 13, 1912 |
| 1,241,930 | Davidson | Oct. 2, 1917 |
| 1,261,797 | Ebeling | Apr. 9, 1918 |
| 1,323,575 | Brahe | Dec. 2, 1919 |
| 1,593,704 | Morris | July 27, 1926 |
| 2,132,908 | Strong | Oct. 11, 1938 |
| 2,226,188 | Wittel | Dec. 24, 1940 |
| 2,254,910 | Richards et al. | Sept. 2, 1941 |
| 2,312,583 | Pendlon | Mar. 2, 1943 |
| 2,518,934 | Renner et al. | Aug. 15, 1950 |
| 2,589,315 | Yelton | Mar. 18, 1932 |
| 2,649,209 | Wilson | Aug. 18, 1953 |
| 2,700,440 | Favre | Jan. 25, 1955 |